United States Patent [19]

Houghton et al.

[11] Patent Number: 5,343,828
[45] Date of Patent: Sep. 6, 1994

[54] PRIMATE AMUSEMENT AND ENVIRONMENTAL ENRICHMENT DEVICE

[75] Inventors: Paul W. Houghton, Woodside; Kenneth R. Bloom, Fairfax, both of Calif.

[73] Assignee: Primate Products, Redwood City, Calif.

[21] Appl. No.: 59,167

[22] Filed: May 7, 1993

[51] Int. Cl.$^5$ .................... A01K 5/00; A01K 15/00
[52] U.S. Cl. ................... 119/51.03; 119/709; 434/259
[58] Field of Search ............ 119/51.01, 702, 709, 119/710, 707, 51.03; 434/259

[56] References Cited

U.S. PATENT DOCUMENTS

| D. 214,928 | 8/1969 | Swett et al. |
|---|---|---|
| 1,534,964 | 4/1925 | Kahnweiler . |
| 3,948,220 | 4/1976 | Fiedler ............ 119/51.03 |
| 3,999,519 | 12/1976 | Rodemeyer ......... 119/51.01 |
| 4,008,526 | 2/1977 | Swett et al. ........ 434/259 |
| 4,451,038 | 5/1984 | Nagy . |
| 4,727,825 | 3/1988 | Houghton . |
| 4,840,374 | 6/1989 | Skinner ............ 434/259 |
| 4,841,911 | 6/1989 | Houghton . |
| 5,139,453 | 8/1991 | Aiken et al. ......... 434/259 |

FOREIGN PATENT DOCUMENTS 1109819  4/1968  United Kingdom ............. 434/259

OTHER PUBLICATIONS

"Alphabet Box Set", Parade Magazine, Nov. 1972, p. G6.
"Form Fitter", Cleo Learning Aids, Cleveland Ohio, Feb. 1976, p. 175.

Primary Examiner—Paul J. Hirsch
Assistant Examiner—Todd E. Manahan
Attorney, Agent, or Firm—Morrison & Foerster

[57] ABSTRACT

A simple puzzle toy designed for the amusement of primates and enrichment of their environment. The device of the preferred embodiment is a sphere having a plurality of holes. Pellets of food or other substances attractive to the primate are placed inside the device. The dimensions the holes are such that the pellets will pass through the holes in certain orientations and will not pass through the holes in other orientations, or such that it will have corners or edges of food and treats too large to be retrieved whole to be chewed until the food is small enough to be aligned with the opening and be removed in its entirety. Arrangement of the pellets, or reduction in size of the pellets by chewing, provides the device's amusement and environmental enrichment value.

3 Claims, 2 Drawing Sheets

PRIMATE AMUSEMENT AND ENVIRONMENTAL ENRICHMENT DEVICE

FIELD OF THE INVENTION

This invention relates generally to a primate amusement and environmental enrichment device. In particular, the invention relates to a device for enhancing the psychological well-being of primates by using problematic task-oriented rewarding or feeding as a means of providing food for diet or reward within an enclosed structure. The device may be used also by human children and non-primate animals.

BACKGROUND OF THE INVENTION

Captive primates require mental stimulation to maintain health, strength and well-being. In fact, government regulations now mandate such humane treatment of caged non-human primates.

There are prior art devices designed for the education and amusement of primates. For example, U.S. Pat. No. 4,727,825 discloses a variable and programmable maze that can be attached to a wall of the primate's cage or enclosure. The primate maneuvers food morsels or tokens within the maze to openings at the maze's end. This device is complicated, however, and not entirely appropriate for simple amusement and environmental enrichment activities.

SUMMARY OF THE INVENTION

This invention provides a simple puzzle toy designed for the amusement of primates and enrichment of their environment. The device of the preferred embodiment is a sphere having a plurality of holes. Pellets of food or other substances attractive to the primate are placed inside the device. The dimensions of the holes are such that food or treats will pass through the holes in certain orientations and will not pass through the holes in other orientations. The dimensions of the holes also allow for corners or edges of food and treats too large to be retrieved whole to be chewed until the food is small enough to be aligned with the opening and be removed in its entirety. Arrangement of the pellets so that they will pass through the holes provides the device's amusement and enrichment value. In another aspect, this invention provides a method for amusing or stimulating a primate and enriching its environment by exposing the primate to one or more of these devices which have been loaded with a primate-attractive substance. This method can also be used to educate the primates or to determine primate preferences for certain shapes and substances or the like.

The invention is described in more detail below with reference to the drawings.

DETAILED DESCRIPTION OF THE PREFERRED EMBODIMENT

The preferred embodiment of our amusement and enrichment device is shown in FIGS. 1–6. The amusement and environmental enrichment device 10 is shaped as a hollow sphere. Holes 12 of a predetermined size and shape are formed in the device. In this embodiment, there are three generally rectangular holes measuring approximately $\frac{3}{4}''$ by $1\text{-}\frac{1}{2}''$. The size and shape of the holes depends in part on the intended contents of the device, as explained below. The size and shape of the hole may also be selected to permit the primate to digitally manipulate the contents of the device through them. The invention covers amusement devices with any size, shape and number of holes, however, as those skilled in the art will understand.

Figure 6:
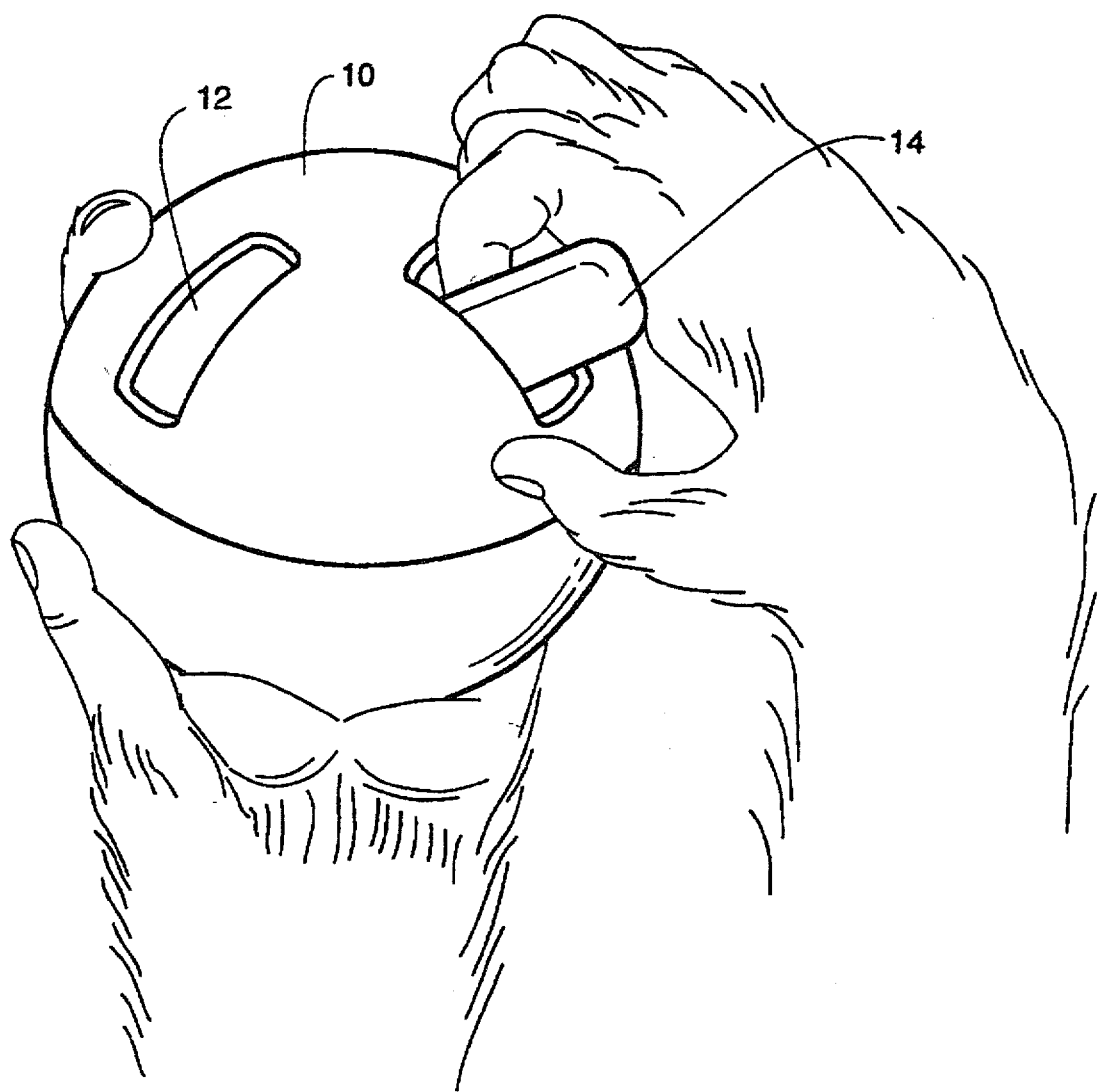
FIG. 6 is a perspective view showing the device of the invention in use amusing a primate.

The device is designed to hold items attractive to the primate, such as a food pellet 14. Pellets or other foods and treats must either fit through one of the holes 12 in certain orientations and not in others, or have protrusions which extend through one of the holes 12 to allow for chewing the food to a size that will fit through one of the holes 12 in certain orientations and not in others. As shown in FIG. 6, the primate must digitally manipulate, shake or otherwise maneuver the pellets into an orientation that enables the primate to ultimately remove the pellets from the device. The maneuvering of the pellets and the subsequent enjoyment provided by eating the pellets provides the device's amusement and environmental enrichment value.

The housing of the device shown in the drawings is constructed in two pieces 16 and 18 to facilitate initial pellet loading by the primate's custodian, as well as to facilitate cleaning and sterilization. As shown most clearly in FIG. 5, the upper and lower housing sections 16 and 18 have cooperating locking surfaces to prevent the primate from separating the sections in an effort to remove the pellets more easily. Upper section 16 has a first cam surface 19 extending from its leading edge 20 to a flat ridge or projection 22. A second cam surface 24 extends from ridge 22 to a groove or indentation 26. The dimensions of these surfaces match the dimensions of corresponding surfaces on lower section 18.

Lower section 18 has a ridge or projection 28 at its leading edge. In the assembled state shown in FIG. 5, ridge 28 lies in groove 26. A cam surface 30 extends from ridge 28 to a groove or indentation 32. Groove 32 ends at a stop surface 34.

Figure 1:
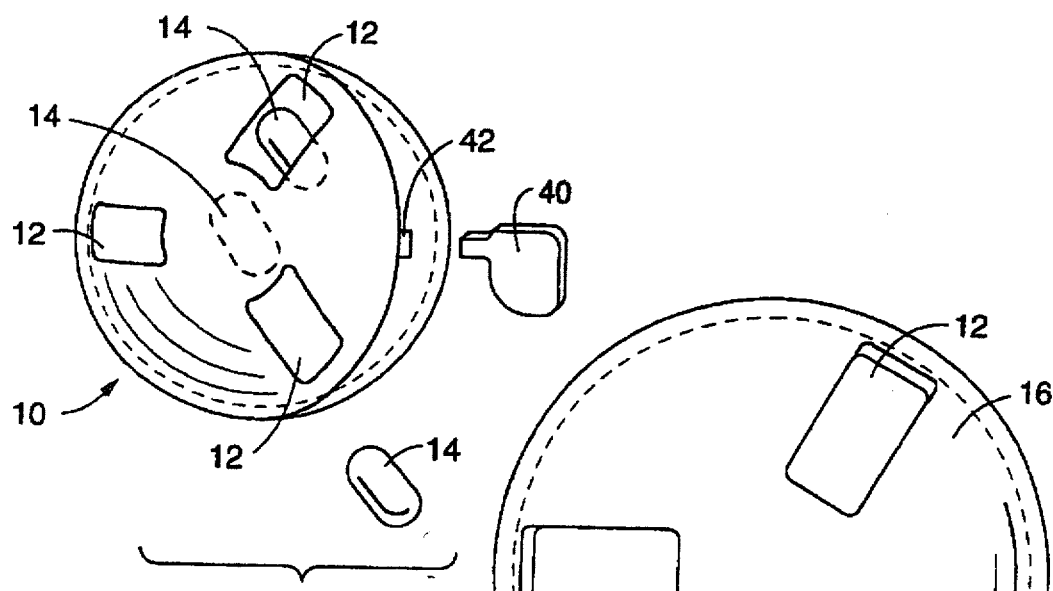
FIG. 1 is an elevational view of the amusement and environmental enrichment device of this invention.
Figure 2:
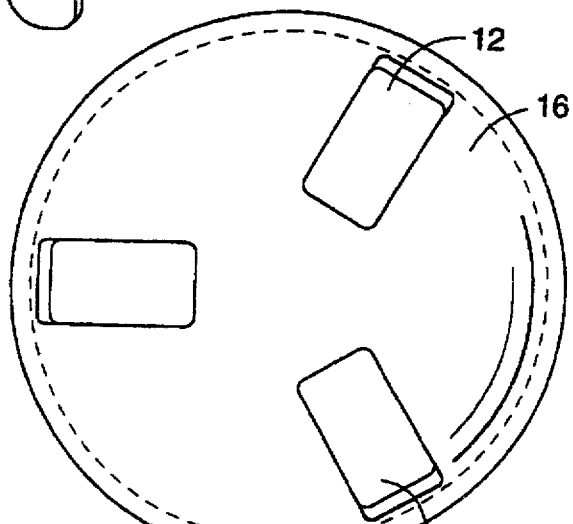
FIG. 2 is a top elevational view of the amusement and environmental enrichment device housing.
Figure 5:
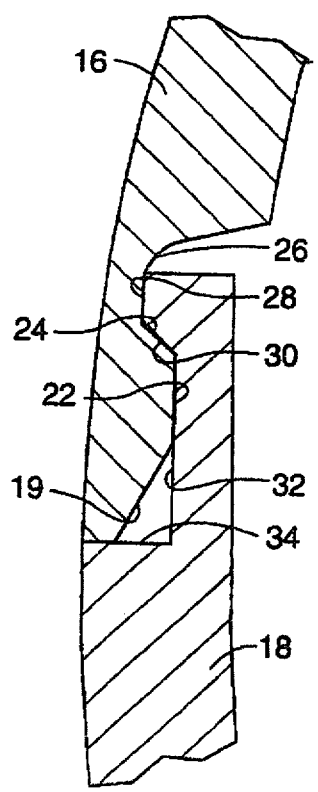
FIG. 5 is a cross-sectional view showing the preferred locking mechanism of this invention.
Figure 3:
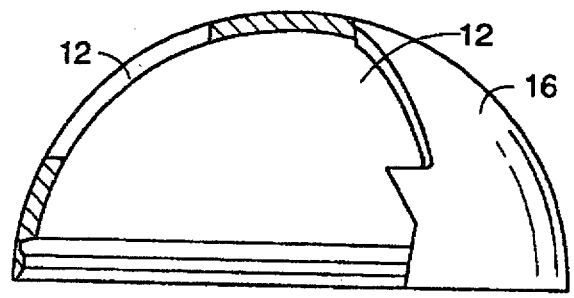
FIG. 3 is a partial cross-sectional view of the upper half of the device housing.
Figure 4:
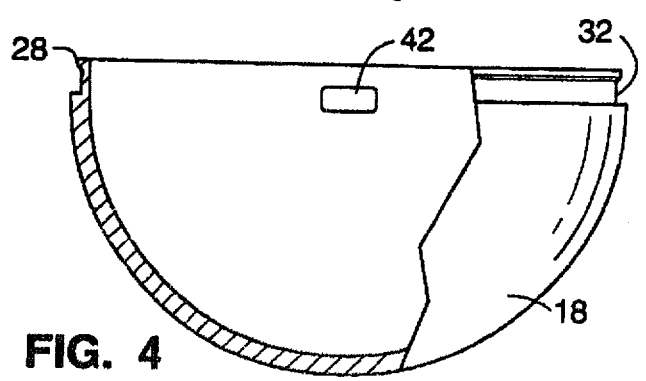
FIG. 4 is a partial cross-sectional view of the lower half of the device housing.

To open the device, the custodian inserts the tool shown as element 40 (FIG. 1) into a hole 42 extending from the interior of the device through groove 32 to the exterior of the device. When the device is in its assembled state, the leading edge 20 of the upper section 16 forms the top edge of the hole 42, as shown in FIG. 1. Tool 40 may be used as a lever to deform the upper and lower sections, thereby permitting cam surfaces 24 and 30 to slide over each other and allowing ridges 28 and 22 to move out of grooves 26 and 32, respectively, to separate the upper and lower sections of the device. After the device has been reloaded with pellets, it may be snapped shut by simply applying pressure between the upper and lower sections. When closing, the interaction of cam surface 19 and ridge 28 causes the upper and lower sections to deform once again to permit ridges 22 and 28 to move into grooves 32 and 26, respectively, to lock the device in its closed position.

The dimensions of the ridges, grooves and cam surfaces depend in part on the deformability, resilience and elasticity of the material out of which the device is made. The dimensions of the locking mechanism and the elasticity of the material must prevent opening of the device by the primate yet permit easy opening by a custodian using an appropriate tool. In the preferred embodiment, device 10 is formed from resilient hard plastics, with or without reinforcement. Typical materials include polyvinylchloride, polyamides such as nylon, polyesters such as plasticized polyarylesters and the like. Other materials may be used, of course, without departing from the invention.

Other configurations of amusement and environmental enrichment devices will be apparent to those skilled in the art. For example, the device housing may be constructed as a cube, ovoid, or any other shape. Any number of holes may be provided in the housing, and the shapes of the holes need not be rectangular. Other locking mechanisms may be used, so long as the custodian can easily open the housing while the primate cannot.

In use the amusement and environmental enrichment device is opened and loaded. Then it is closed and given to the primate. In the most basic application the primate picks it up, focuses on it and works to remove the desired object enclosed within it. This provides the amusement and mental stimulation appropriate for environmental enrichment. In other applications, the primate may be exposed to multiple devices differing in shape, color, contained material or the like. This can provide a multidimensional educational experience or, when coupled with observation of the primate's behavior, can provide insight into primate preferences, learning patterns or the like.

What is claimed is:

1. An amusement and environment enrichment device comprising a housing having an interior space and at least one hole through the housing to the interior space and at least one item disposed within the interior space, the housing comprising a first section, a second section separable from the first section, and a locking mechanism holding the first section and the second section together, the locking mechanism comprising a cam surface on the first section, and the at least one item having a size and shape permitting it to pass through the at least one hole in at least one spatial orientation of the at least one item and prohibiting it from passing through the at least one hole in at least one spatial orientation of the at least one item, or such that the item will have corners or edges of food and treats too large to be retrieved whole to be chewed until the food is small enough to be aligned with the at least one hole and be removed in its entirety.

2. A method for amusing and enriching a primate's environment comprising the following steps:

provide a housing having an interior space and at least one hole through the housing to the interior space;

providing an item attractive to a primate and having a shape such that it will either pass through the at least one hole in one orientation of the item and will not pass through the at least one hole in another orientation of the item, or such that the item will have corners or edges of food and treats too large to be retrieved whole to be chewed until the food is small enough to be aligned with the at least one hole and be removed in its entirety;

placing the attractive item within the interior space, the placing step comprising the step of separating a first section of the housing from a second section of the housing;

attaching the first section of the housing to the second section of the housing;

permitting the primate to attempt to remove the item from the interior space through the at least one hole.

3. The method of claim 2 wherein the separating step comprises inserting a separation tool between the first and second sections to separate the first section from the second section.

* * * * *